C. HANSEN.
CORN AND BEAN PLANTER.
APPLICATION FILED JUNE 10, 1911.
1,010,255.
Patented Nov. 28, 1911.
2 SHEETS—SHEET 2.
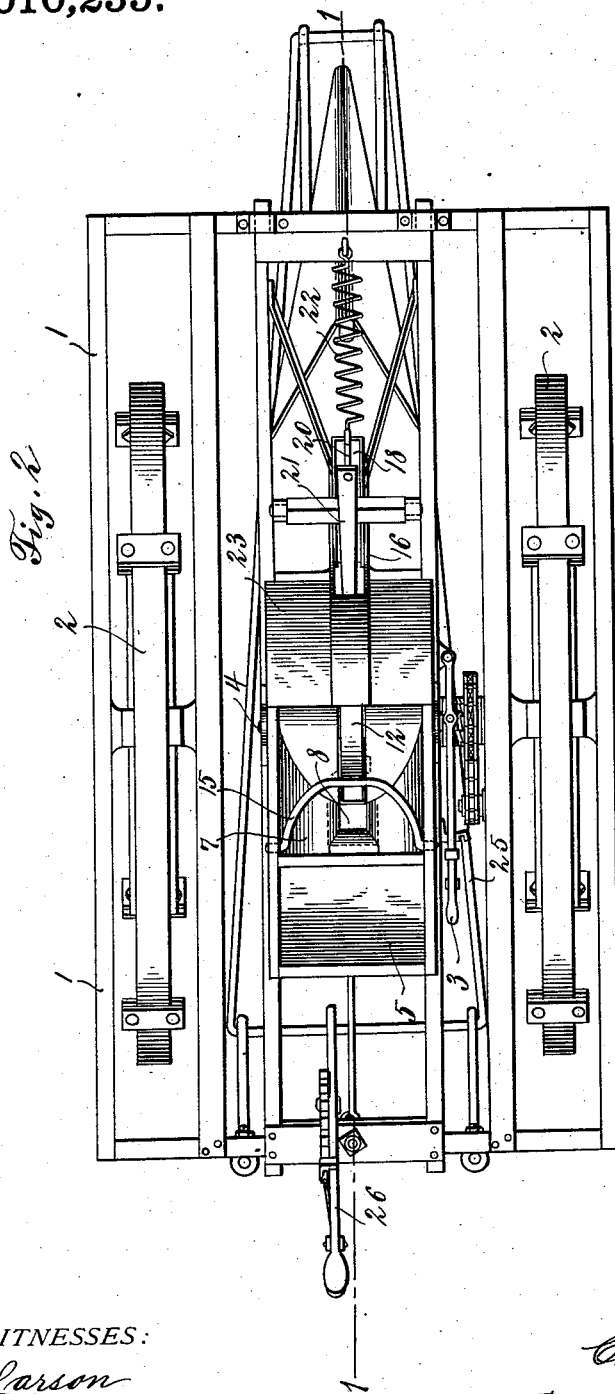
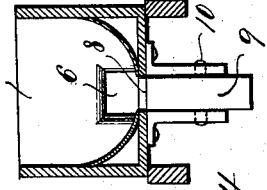
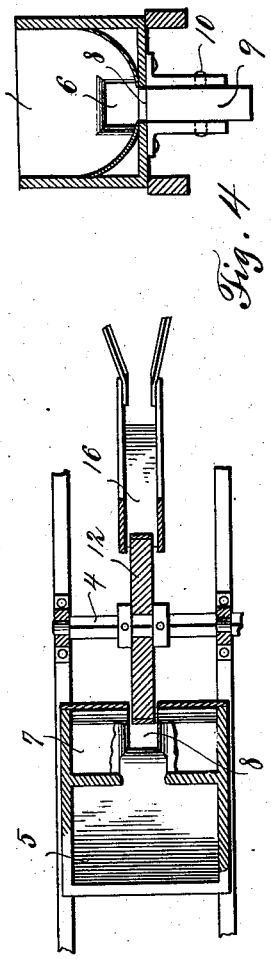
WITNESSES:
E. Larson
H. N. Brooks.
INVENTOR
Christian Hansen
BY Beeler & Robb
J. H. Robb, Attorneys

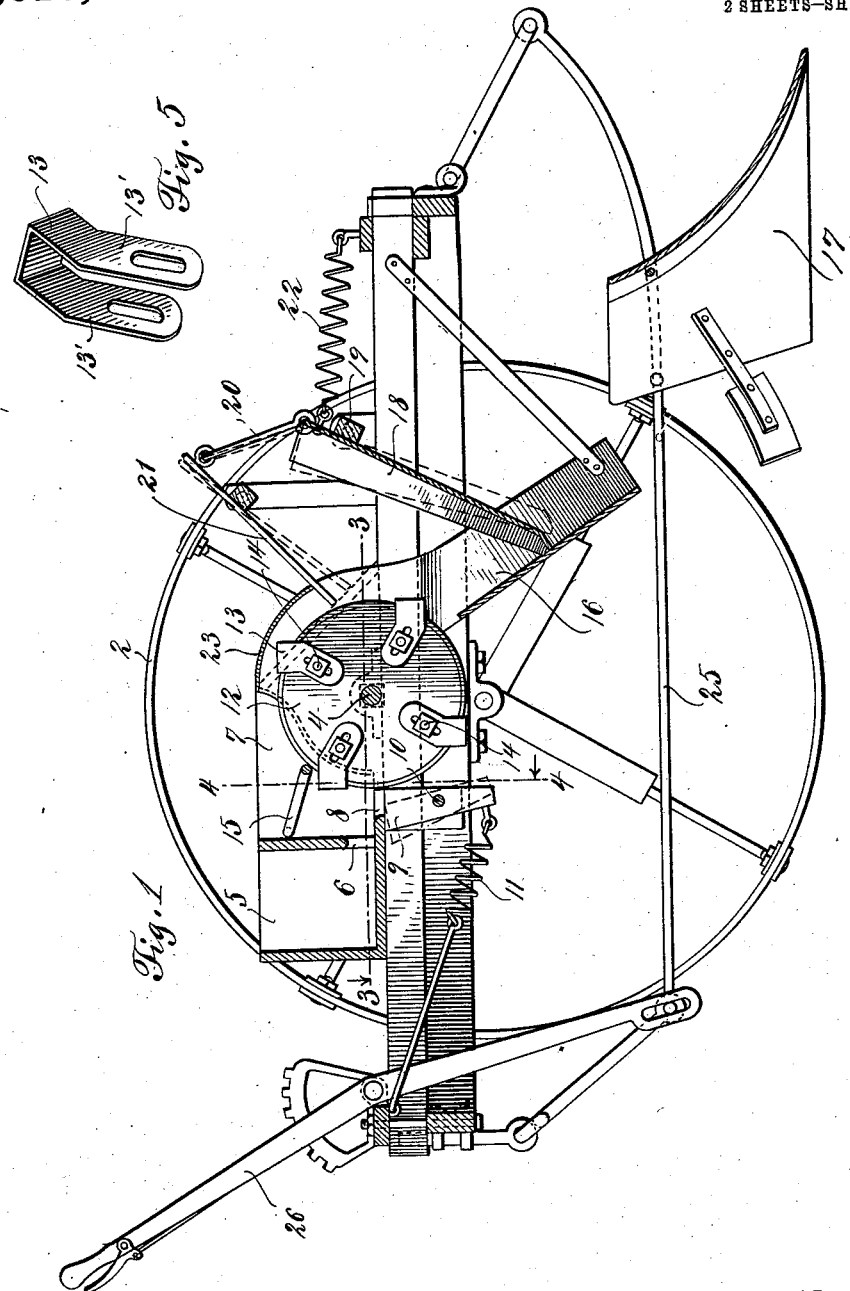

UNITED STATES PATENT OFFICE.

CHRISTIAN HANSEN, OF CHICAGO, ILLINOIS.

CORN AND BEAN PLANTER.

1,010,255.

Specification of Letters Patent. Patented Nov. 28, 1911.

Application filed June 10, 1911. Serial No. 632,429.

*To all whom it may concern:*

Be it known that I, CHRISTIAN HANSEN, a citizen of the United States, residing at Chicago, in the county of Cook and State of Illinois, have invented certain new and useful Improvements in Corn and Bean Planters, of which the following is a specification.

The present invention relates to agricultural implements of the type commonly called corn and bean planters, and involves particularly certain improvements in the seed dropping mechanism.

In carrying out the invention, the dropping disk controlling the feeding of the seed to the seed spout leading to the ground, is provided with peculiarly adjustable seed cups. Associated with the dropper disk is a special form of leveler for the seed received in the cups, special means whereby gates normally closing the seed spout or tube are operable by the seed cups of the disk as the latter turns, and a special valve for closing and opening in the bottom of the seed box, through which the seed cups move in the operation of the planter.

For a full understanding of the present invention, reference is to be had to the following description and to the accompanying drawings, in which—

Figure 1 is a vertical longitudinal sectional view, about on the line 1—1 of Fig. 2, of a planter embodying mechanism comprising the invention; Fig. 2 is a top plan view; Fig. 3 is a section taken about on the line 3—3 of Fig. 1; Fig. 4 is a section taken about on the line 4—4 of Fig. 1; Fig. 5 is a detail perspective view of one of the seed cups.

Throughout the following detail description and on the several figures of the drawings, similar parts are referred to by like reference characters.

A planter embodying this invention comprises the customary supporting frame 1 mounted on ground wheels 2, which are adapted to rotate the axle upon which they are mounted, a suitable clutch operating lever 3 being employed to connect the dropper shaft 4 with the drive axle when it is desired to operate the seed dropping mechanism.

On the frame 1 is supported a seed box 5 which has a feed opening 6 communicating with a feed compartment 7 in the bottom of which is provided an opening 8 normally closed by the upper end of a valve 9, said valve being pivoted between its ends, as shown at 10 and having its lower end connected by a spring 11 to the frame. The dropper disk 12 is mounted upon the shaft 4 and carries a plurality of seed cups 13. The cups 13 are of peculiar form in that they are provided with spaced sides 13′ adapted to be received upon opposite sides of the disk 12 and being formed with elongated slots through which fastenings 14 pass. The cups have an end portion arranged somewhat tangentially with respect to the disk 12 and with one edge normally bearing against the periphery of the disk. The slots in the sides 13′ of the seed cups 13 in coöperation with the fastenings 14, permit of combined radial and circumferential adjustment of the seed cups whereby the capacity of the latter may be increased or decreased. In the normal rotation of the dropper disk 12, the cups move through the opening 8 and receive the seed therein just as they pass through said opening. The outermost portions of the cups are adapted to engage the adjacent side of the valve 9 to automatically force said valve into a position permitting the cups to pass the same through the opening 8. In the compartment 7 is also provided a leveler 15 consisting of a pivoted bail, shown more clearly in Fig. 2, the intermediate portion of the bail being adapted to operate on the periphery of the disk 12 and sweep over the open ends of the cups as it engages with the latter, whereby to level off the seed and insure dropping of a uniform quantity of the latter.

The seed is dropped by means of the parts 12 and 13 into a discharge spout 16 leading downwardly in rear of the plow or furrow opener 17. Said spout 16 is normally closed by means of a gate 18 which is pivoted between its ends at 19 and connected at its upper end by a rod 20 with a trip plate 21. The trip plate 21 is pivoted between its ends and its lower end is arranged in the path of movement of the seed cups 13 which intermittently engage the plate 21 and thereby impart simultaneously pivotal movement to said plate and to the gate 18 whereby the latter is opened to permit the seed in the spout 16 to drop to the ground. Normally a spring 22 coacts with the gate 18 to hold the latter in a position in which the lower portion of the spout 16 is closed. It will be apparent that by radial adjustment of the seed cups 13, the capacity of said cups is increased the more the end portions are projected from the periphery of the disk 12 and vice versa. Since the cups 13 directly engage the trip plate 21, it will be apparent that the more the cups project from the disk to give increased capacity thereto, the greater will be the distance the plate 21 is moved when struck by the cups as they rotate, this being desirable in order that the gate 18 will be opened to an extent commensurate with the amount or quantity of seed dropped into the spout 16. A shield 23 extends over the disk 12 and forms a guard in a manner readily apparent.

The plow 17 may be raised from the ground by pushing forwardly on the plow carrying frame 25, or may be lowered by pulling backwardly on said frame, the necessary movement to the frame being imparted by the lever 26 having a sliding connection therewith, as will be obvious.

Having thus described the invention, what is claimed as new is:

1. In a planter, the combination of a frame, seed dropping mechanism thereon comprising a seed box, a circular dropper disk, and seed cups comprising an end portion arranged tangentially with respect to the periphery of the disk with one edge in contact with the latter and spaced sides arranged at opposite sides of the dropper disk and formed with slots arranged radially with respect to the axis of the disk, and fastenings passing through the disk and slots securing the cups in position thereon permitting adjustment of the same.

2. In a planter, the combination of a frame, seed dropping mechanism thereon comprising a seed box, a dropper disk, seed cups adjustable radially on said disk, a discharge spout adapted to receive the seed from the seed cups, and means operable by the seed cups as the disk turns for opening and closing said discharge spout a greater or less extent according to the adjustment of the cups.

3. In a planter, the combination of a frame, a seed box thereon, a dropper disk, adjustable seed cups thereon, a discharge spout for receiving the seed from the seed cups, a closure for said discharge spout, and means operable by the seed cups as the disk turns to open said closure automatically to a variable extent according to the adjustment of the seed cups.

4. In a planter, the combination of a frame, a seed box thereon, a dropper disk, seed cups carried by said disk, a discharge spout for receiving the seed from the cups, a pivoted closure for said spout having its lower end arranged to open and close the latter, a trip plate pivoted to the frame between its ends and having one end arranged to be struck intermittently by the seed cups, and a link connecting the other ends of the trip plate and closure for the purpose described.

5. In a planter, the combination of a frame, a seed box thereon provided with an opening in its bottom, a dropper disk, seed cups projecting from the periphery of said disk and movable through the opening in said bottom, a valve pivoted between its ends and at one end normally closing the opening in the bottom of the seed box and adapted to be directly engaged by the seed cups as the disk rotates whereby the valve is forced into an open position intermittently and a spring connected with the other end of the valve to hold the same in its normal position.

In testimony whereof I affix my signature in presence of two witnesses.

CHRISTIAN HANSEN.

Witnesses:
JOHN STEWART,
EDMUND KOCH.